United States Patent
Eilenberger et al.

(10) Patent No.: US 12,529,838 B2
(45) Date of Patent: Jan. 20, 2026

(54) ARRANGEMENT AND METHOD FOR EFFICIENT NON-LINEAR LIGHT CONVERSION

(71) Applicant: Friedrich-Schiller-Universitaet Jena, Jena (DE)

(72) Inventors: Falk Eilenberger, Jena (DE); Andrey Turchanin, Jena (DE); Antony George, Jena (DE); Markus Schmidt, Jena (DE)

(73) Assignees: FRIEDRICH-SCHILLER UNIVERSITAET JENA, Jena (DE); FRAUNHOFER GESELLSCHAFT ZUR FOERDERUNG DER ANGEWANDTEN FORSCHUNG E.V, Munich (DE)

( * ) Notice: Subject to any disclaimer, the term of this patent is extended or adjusted under 35 U.S.C. 154(b) by 314 days.

(21) Appl. No.: 17/996,455

(22) PCT Filed: Apr. 28, 2021

(86) PCT No.: PCT/DE2021/100383
§ 371 (c)(1),
(2) Date: Jun. 12, 2023

(87) PCT Pub. No.: WO2021/219168
PCT Pub. Date: Nov. 4, 2021

(65) Prior Publication Data
US 2023/0393331 A1    Dec. 7, 2023

(30) Foreign Application Priority Data

Apr. 30, 2020  (DE) .......................... 102020002708.3
Jul. 16, 2020  (DE) .......................... 102020118780.7

(51) Int. Cl.
G02B 6/02    (2006.01)
G02F 1/35    (2006.01)

(52) U.S. Cl.
CPC ..... G02B 6/02285 (2013.01); G02B 6/02395 (2013.01); G02F 1/354 (2021.01);
(Continued)

(58) Field of Classification Search
CPC .......... G02F 1/35–397; G02B 6/02285; G02B 6/02395
See application file for complete search history.

(56) References Cited

U.S. PATENT DOCUMENTS 8,749,875 B2 * 6/2014 Benton ................. G02F 1/3544
359/328
11,487,185 B2 * 11/2022 Suchowski ........... G02F 1/3536
(Continued)

OTHER PUBLICATIONS

A. Lewis, F. De Lucia, W. Belardi, F. Poletti, C. C. Huang, D. Hewak, P. J. A. Sazio, "Composite material hollow core fibers: functionalisation with silicon and 2D materials," Proc. SPIE 10535, Integrated Optics: Devices, Materials, and Technologies XXII, 105350N (Feb. 23, 2018). (Year: 2018).*
(Continued)

*Primary Examiner* — Rhonda S Peace
(74) *Attorney, Agent, or Firm* — Abel Schillinger, LLP (57) ABSTRACT

The invention relates to an arrangement and a method for efficient, non-linear light conversion. The object of the present invention of specifying an arrangement for efficient, non-linear light conversion, which simultaneously optimally fulfills the local conversion rate, the interaction scale, and the dispersive properties, is achieved in that the arrangement is provided in the form of a component, which comprises an optical waveguide or an optical fiber with or without cavities, wherein said arrangement consists of fiber cladding substrate or waveguide substrate (IV) with an adapted
(Continued)

geometry, which defines the light-guiding properties of the fiber mode with designed dispersion properties (VI), and wherein the waveguide or the core carries a grown, atomically-thin layer of transition metal dichalcogenides in the form of crystallites, wherein this layer completely or partially covers the waveguide or the core.

9 Claims, 4 Drawing Sheets

(52) U.S. Cl.
 CPC .......... *G02F 1/3544* (2013.01); *G02F 1/3534* (2013.01); *G02F 1/3536* (2013.01)

(56) References Cited

U.S. PATENT DOCUMENTS

| | | | | |
|---|---|---|---|---|
| 11,538,682 | B2* | 12/2022 | Chiu | C23C 8/08 |
| 2015/0108431 | A1* | 4/2015 | Kim | H10D 30/60 |
| | | | | 257/21 |
| 2018/0308692 | A1* | 10/2018 | Muratore | H01L 21/02568 |
| 2020/0057354 | A1* | 2/2020 | Cao | G02F 1/313 |
| 2020/0090933 | A1* | 3/2020 | Muratore | H01L 21/02422 |
| 2023/0393331 | A1* | 12/2023 | Eilenberger | G02B 6/02285 |
| 2025/0037999 | A1* | 1/2025 | Muratore | H01L 21/02422 |

OTHER PUBLICATIONS

Francesco De Lucia, et al., "Enhancement of nonlinear functionality of step-index silica fibers combining thermal poling and 2D materials deposition," Opt. Express 28, 34461-34471 (2020). (Year: 2020).*
Lewis, A. et al. "Composite material hollow core fibers: functionalisation with silicon and 2D materials" Proceedings of SPIE; [Proceedings of SPIE ISSN 0277-786X vol. 10524 ], SPIE, US, vol. 10535, Feb. 23, 201)) (201))-Feb. 23), pp. 105350N 1-8.
De Lucia, F. et al. "Enhancing the nonlinear functionality of step-index silica fibers through 1-3 the combination of thermal poling and 2D materials" SPIE Proceedings, [Proceedings of SPIE ISSN 0277-786X], SPIE, US. vol. 11282, 1)) Feb. 2020 (Feb. 18, 2020), pp. 34461-34471.
Blauth, M. et al. "Ultra-compact photodetection in atomically thin MoSe_2" arxiv.org, Cornell University Library, 201 Olin Library Cornell UNJVJ:,,RSJTY 11HACA, NY 14853, May 16, 2019, 18 pages.
Lewis A et al. "Composite material hollow core fibers: functionalisation with silicon and 2D materials" Proceedings of SPIE; [Proceedings of SPIE ISSN 0277-786X vol. 10524 ], SPIE, US, vol. 10535, Feb. 23, 201)) (201))-Feb. 23), pp. 1-9, 105350N-105350N.
De Lucia Fetal. "Enhancing the nonlinear functionality of step-index silica fibers through 1-3 the combination of thermal poling and 2D materials" SPIE Proceedings, [Proceedings of SPIE ISSN 0277-786X], SPIE, US. vol. 11282, 1)) Feb. 2020 (Feb. 18, 2020), pp. 1-11)).
Blauth Metal. "Ultra-compact photodetection in atomically thin MoSe_2" arxiv.org, Cornell University Library, 201 Olin Library Cornell UNJVJ: RSJTY 11HACA, NY 14853. May 16, 2019 (May 16, 2019), pp. 1-18.
Mupparapu, "Integration of two-dimensional transition metal dichalcogenides with Mie-resonant dielectric nanostructures," Advances in Physics: X 2020, vol. 5, No. 1, 1734083 https://doiorg/10.1080/23746149.2020.1734083, pp. 1-32.
Y.-W. Song, S.-Y. Jang, W.-S. Han, and M.-K. Bae, "Graphene mode-lockers for fiber lasers functioned with evanescent field interaction," Applied Physics Letters 96, 051122 (2010), pp. 1-4.
A. George, C. Neumann, D. Kaiser, R. Mupparapu, T. Lenert, U. Huebner, Z. Tang, A. Winter, U. Kaiser, I. Staude, and A. Turchanin, "Controlled growth of transition metal dichalcogenide monolayers using knudsen-type effusion cells for the precursors," Journal of Physics: Materials (2018), pp. 1-13.
L. K. Tan, B. Liu, J. H. Teng, S. Guo, H. Y. Low, and K. P. Loh, "Atomic layer deposition of a mos2 film," Nanoscale 6, pp. 10584-10588 (2014), pp. 1-5.
George, C. Neumann, D. Kaiser, R. Mupparapu, T. Lenert, U. Huebner, Z. Tang, A. Winter, U. Kaiser, I. Staude, A. Turchanin, "Controlled growth of transition metal dichalcogenide monolayers using knudsen-type effusion cells for the precursors," Journal of Physics: Materials (2018), pp. 1-13.
A. V. Husakou and J. Herrmann, "Supercontinuum Generation of Higher-Order Solitons by Fission in Photonic Crystal Fibers," Phys. Rev. Lett. 87, 203901 (2001), pp. 1-4.
A. Efimov, A. J. Taylor, F. G. Omenetto, J. C. Knight, W. J. Wadsworth, and p. S. J. Russell, "Phase-matched third harmonic generation in microstructured fibers," Opt. Express 11, pp. 2567-2576 (2003).
J. M. Hickmann and A. Gomes, "Dynamics of femtosecond soliton-effect optical compression in monomode fibers," Opt. Commun. 97, pp. 333-336 (1993).
R. Salem, M. A. Foster, A. C. Turner, D. F. Geraghty, M. Lipson, and A. L. Gaeta, "Optical time lens based on four-wave mixing on a Silicon chip," Opt. Lett. 33, pp. 1047-1049 (2008).
H. Fukuda, K. Yamada, T. Shoji, M. Takahashi, T. Tsuchizawa, T. Watanabe, J. ichi Takahashi, and S. ichi Itabashi, "Four-wave mixing in silicon wire waveguides," Opt. Express 13, pp. 4629-4637 (2005).

\* cited by examiner

ARRANGEMENT AND METHOD FOR EFFICIENT NON-LINEAR LIGHT CONVERSION

The invention relates to an arrangement and a method for efficient, non-linear light conversion according to the generic type of the claims.

Non-linear light conversion is an established method for generating light with special properties in corresponding light sources. In general, three aspects are essential for the effectiveness and the applicability of non-linear light converters:

1. The local conversion rate, which is given by the strength of the non-linear polarization for a given electromagnetic field for a specific material,
2. The interaction scale, which is determined by interaction length, interaction cross-section, and the constancy of performance of the conversion structure, and
3. The dispersive properties (defines to what extent a locally efficient conversion can be macroscopically utilized in a system).

While the 1st aspect directly depends upon the material used, the 2nd and the 3rd aspects depend upon both the material and its geometry. The 1st aspect can be controlled by nanostructuring—in particular, in wave-guiding structures.

The effectiveness and applicability of non-linear waveguides thus requires favorable, non-linear material parameters and the ability to utilize nanostructured components of high quality.

For light sources with wavelengths for which no or no equivalent laser light sources are available, i.e., primarily in the range of ultraviolet and near-infrared and far-infrared light and for ultrashort laser pulses in a broader spectral range, light converters based upon three-wave mixing are usually used.

Free-space optical systems with special non-linear crystals are primarily used in this range.

Free-space optical systems are in principle limited in all three aspects mentioned above. Guided optical systems made of crystalline non-linear media are used primarily in resonator geometries (so-called OPO's). In comparison to free-space optical systems, improvements result in the 2nd and 3rd aspects, wherein the targeted modification of dispersive properties by means of nanostructuring in non-linear crystals is significantly less pronounced than in linear media and is often to the disadvantage of the 2nd aspect.

Optical systems in spatial contact with non-linear volume media refer to four-wave mixing. There are great restrictions in the ranges of the 1st aspect (low non-linear conversion—for example, in gases) and of the 3rd aspect (strong influence of the dispersive properties of the waveguides by unfavorable linear properties of the non-linear materials).

Light sources for stochastically-generated photon pairs with a defined quantum correlation are generally derived from the wavelength converters mentioned above, wherein three-wave mixing processes in crystalline media are mostly used here.

By utilizing conventional volume crystals, the 1st aspect is somewhat pronounced.

The setting of specific correlation properties is accomplished by the design of dispersive properties (3rd aspect).

In free-space-based systems, the conversion efficiency (1st aspect) and the degrees of freedom of the dispersion control are greatly restricted (3rd aspect).

Some restrictions are reduced in waveguide-based systems, but the dispersion control (3rd aspect) by means of nanostructuring of the crystal often limits the interaction scale (2nd aspect).

Spatially coherent white-light sources are based upon the effect of supercontinuum generation and generally utilize four-wave mixing in waveguides, which results in a substantial contribution to the 2nd and 3rd aspects.

Advantageous white-light properties can be caused by targeted control of the dispersive behavior. A corresponding control generally requires nanostructuring of the fiber guide or the waveguide. Frequently, this is possible only in glass.

Since glasses have a very low local conversion (1st aspect), this means that white-light sources often have to be operated with a high pumping power.

The utilization of highly non-linear media to improve the 1st aspect, e.g., in infiltrated optical fibers, has negative effects on the 3rd aspect and cannot be implemented in an application-oriented manner for practical reasons (isolation of liquids and gases, toxicity).

In general, it is therefore difficult to simultaneously fulfill all three aspects for a given material.

Materials with highly non-linear interaction generally fulfill only the 1st aspect really well.

Fibers and waveguides made of non-linear or only weakly non-linear materials fulfill the 2nd and 3rd aspects easily.

The material and geometry of the fibers and waveguides can be selected such that the interaction length and interaction cross-section as well as dispersive properties of the mode are optimized.

The light-material interaction length in transition metal dichalcogenides (TMDC)—in particular, in monolayer TMDC—on planar substrates is limited to the sub-nanometer range due to their minuscule thickness.

This restriction reduces the entire optical response of the TMDC's and greatly restricts possible applications.

Strategies that improve the interaction between light and material are therefore very important. Coupling the TMDC's with different types of optical resonators is a widely used method for improving the light-material interaction.

However, this is limited to narrowband resonances, while broadband and ultra-fast operation cannot be implemented in this way.

On the other hand, by integrating TMDC's on waveguides or glass fibers, the interaction length can be increased in a broadband and non-resonant manner. The resulting 2-D-functionalized waveguides (2-DFWG) can utilize the optical properties of TMDC's by interaction with parts of the evanescent fields of the guided modes. 2-DFWG's can have remarkable properties by utilizing, for example, the non-linear or excitonic properties of TMD's. Previous attempts to produce 2-DFWG's are based upon the mechanical transmission of exfoliated TMDC's to the waveguides or glass fibers.

However, this approach is prone to uncontrollable stress fields and is neither reproducible nor scalable. Such methods are therefore hardly suitable for future large-scale integration.

It is known that TMDC's (=transition metal dichalcogenides), i.e., compounds consisting of a transition metal (e.g., molybdenum or tungsten) and two chalcogen constituents (e.g., sulfur, selenium, or tellurium), with a thickness of only one crystalline unit cell, generally exhibit an unusually strong interaction with light and electronic signals.

In particular, they exhibit a very strong relationship between electric field and electrical polarization both for three-wave mixing and for four-wave mixing. In this case, frequently used materials are surpassed by many orders of magnitude (three-wave mixing: approx. $10^4$ BBO; four-wave mixing: approx. $10^7 \times SiO_2$). They are therefore outstandingly suitable, even in the case of only a small overlap between mode and material, for fulfilling the 1st aspect. A single atomic layer does not result in any significant linear influence on the propagation of light in the transparency range.

However, as a pure material, they are completely unsuitable for the 2nd and 3rd aspects. The interaction length is limited to one atomic layer; dispersion control is essentially not possible.

According to the current prior art, TMDC's are transferred to substrates or grown directly. During the transfer, fragments of a monolayer are transferred to a substrate by means of a stamp with defined adhesion [K. F. Mak, C. Lee, J. Hone, J. Shan, and T. F. Heinz, Atomically Thin mos2: A New Direct-Gap Semiconductor, Phys. Rev. Lett. 105, 136805 (2010)]. This method is also limited to planar substrates and is thus suitable only to a limited extent for fibers [Y.-W. Song, S.-Y. Jang, W.-S. Han, and M.-K. Bae, Graphene mode-lockers for fiber lasers functioned with evanescent field interaction, Applied Physics Letters 96, 051122 (2010)] and waveguides. Moreover, it is little reproducible.

The growth of TMDC's is generally based upon the gas phase by means of chemical vapor deposition [A. George, C. Neumann, D. Kaiser, R. Mupparapu, T. Lenert, U. Huebner, Z. Tang, A. Winter, U. Kaiser, I. Staude, and A. Turchanin, Controlled growth of transition metal dichalcogenide monolayers using knudsen-type effusion cells for the precursors, Journal of Physics: Materials (2018)] or atomic layer deposition [L. K. Tan, B. Liu, J. H. Teng, S. Guo, H. Y. Low, and K. P. Loh, Atomic layer deposition of a mos2 film, Nanoscale 6, 10584-10588 (2014)].

Both methods are conformal, i.e., they are suitable for curved, structured, and non-planar substrates and waveguide structures.

George, C. Neumann, D. Kaiser, R. Mupparapu, T. Lenert, U. Huebner, Z. Tang, A. Winter, U. Kaiser, I. Staude, A. Turchanin, Controlled growth of transition metal dichalcogenide monolayers using knudsen-type effusion cells for the precursors, Journal of Physics: Materials (2018) specifically discloses a method for producing TMDC monolayers. This document does not teach the application of the generated monolayers in any form and explicitly discusses only the deposition on planar substrates.

L. K. Tan, B. Liu, J. H. Teng, S. Guo, H. Y. Low, and K. P. Loh, Atomic layer deposition of a $MoS_2$ film, Nanoscale 6, 10584-10588 (2014)".

Specifically discloses a method for producing TMDC monolayers does not disclose an application of the generated monolayer in any form and explicitly discusses only the deposition on planar substrates.

Gas-phase-based growth can take place on the surface of a medium or else on the inside of a cavity of the medium, insofar as this inner surface is accessible to the process gas. Since the processes generally take place at a high temperature, specific restrictions regarding substrate materials apply.

The object of the present invention is to specify an arrangement and a method for efficient, non-linear light conversion, which avoids the above-mentioned disadvantages of the prior art and in particular simultaneously optimally fulfills the three aspects:

1. The local conversion rate, which is given by the strength of the non-linear polarization for a given electromagnetic field for a specific material,
2. The interaction scale, which is determined by interaction length, interaction cross-section, and the constancy of performance of the conversion structure, and
3. The dispersive properties (defines to what extent a locally efficient conversion can be macroscopically utilized in a system).

This object is achieved by an arrangement according to main claim 1, by a method according to independent claim 5, and a use according to independent claim 9.

Advantageous embodiments can be taken from the dependent claims.

The essence of the invention is that the arrangement and the method for efficient, non-linear conversion of light in optical fibers and waveguides are based upon the direct growth of atomically-thin transition metal dichalcogenides (TMDC's) on the wave-guiding region of optical fibers or comparable optical waveguides.

An arrangement is understood to mean a component in the sense of the connections of one or more separate, atomically-thin, two-dimensional TMDC layers to conventional optical waveguides or fibers in order to enable or amplify the non-linear interaction of light which is guided in a fiber mode or waveguide mode. In this case, the fiber guide or waveguide contributes by means of one or more light-guiding modes (referred to hereafter as "mode") to the light guidance and to the control of the dispersive properties.

The TMDC layer, which overlaps directly with the mode, mainly controls the non-linear interaction. The connection is established by direct and controlled growth of TMDC's on the optical fiber guide or waveguide in a suitable process.

With this technical solution, it is possible to massively amplify the non-linear interaction of optical fibers and waveguides and to operate non-linear light converters at significantly lower optical powers, or to achieve higher conversion efficiency or utilize non-linear effects, which are in principle inaccessible in certain classes of materials and waveguides.

The first class includes effects based upon four-wave mixing, which results in the generation of spatially coherent white light/supercontinuum [A. V. Husakou and J. Herrmann, Supercontinuum Generation of Higher-Order Solitons by Fission in Photonic Crystal Fibers, Phys. Rev. Lett. 87, 203901 (2001)] or in laser pulse compression (spectral broadening [V. Karpman, Self-modulation of nonlinear plane waves in dispersive media, J. Exp. Theor. Phys. 6, 277 (1967)] and are utilized as soliton compressor [J. M. Hickmann and A. Gomes, Dynamics of femtosecond soliton-effect optical compression in monomode fibers, Opt. Commun. 97, 333-336 (1993)] for opto-optical signal processing/time lens [R. Salem, M. A. Foster, A. C. Turner, D. F. Geraghty, M. Lipson, and A. L. Gaeta, Optical time lens based on four-wave mixing on a Silicon chip, Opt. Lett. 33, 1047-1049 (2008)], wavelength conversion [H. Fukuda, K. Yamada, T. Shoji, M. Takahashi, T. Tsuchizawa, T. Watanabe, J. ichi Takahashi, and S. ichi Itabashi, Four-wave mixing in silicon wire waveguides, Opt. Express 13, 4629-4637 (2005)] and for generating coherent light of short wavelength/third harmonic [A. Efimov, A. J. Taylor, F. G. Omenetto, J. C. Knight, W. J. Wadsworth, and P. S. J. Russell, Phase-matched third harmonic generation in micro-structured fibers, Opt. Express 11, 2567-2576 (2003)].

The second class includes effects based upon the second harmonic, which do not occur in conventional waveguide materials, such as amorphous solid bodies (glass), and highly symmetrical, crystalline solid bodies (silicon) [R. W. Boyd, Nonlinear optics (Academic Press, 2003)]. These include the generation of coherent light of short wavelength from one or two pump waves (second harmonic, sum frequency mixing), and the generation of coherent light of greater wavelength (difference frequency mixing) and of photon pairs (spontaneous parametric generation).

Non-linearly generated light, based upon the above-mentioned effects, is used, for example, in material analysis/spectroscopy, in optical communication, in quantum technology, in laser material processing, optical measurement technology, and in microscopy/life sciences. An increase in efficiency here allows new applications to be developed and existing applications to be designed to be more cost-efficient and more energy-efficient.

The advantage of this technical solution is that the connection of one or fewer atomic layers of TMDC's with a part of the mode significantly amplifies the non-linear interaction without substantially influencing the linear properties of the mode. The 1st through 3rd aspects can thus be optimized independently.

Direct deposition of TMDC's onto the outside or inside of a fiber or of waveguides guarantees high material quality, large contact surfaces, and reproducible results.

The wavelength conversion and white-light generation are thus possible at significantly lower peak powers and with significantly smaller and less expensive beam sources, and photon pair sources are significantly more efficient.

Due to the possibility of non-linear light converters in guided systems, these systems become more integrable and more robust than free-beam systems.

The technical solution in the form of the arrangement/the component consists of an optical waveguide or an optical fiber/fiber cladding substrate or waveguide substrate with an adapted geometry, which defines the light-guiding properties of the fiber mode/the fiber modes/of the structured, waveguiding fiber core with designed dispersion properties.

In addition, the mode may overlap with the physical surface of the waveguide/the outer waveguide surface or with an accessible cavity/the inner waveguide surface.

In the production of the TMC's, during convective or forced transport of the atmosphere to the surface of the waveguide or of the fiber or of the inner surface, during convective or forced transport of the atmosphere along cavities of the waveguide or of the fiber, a cover in the form of a grown, atomically-thin layer of transition metal dichalcogenides is produced by means of chemical vapor deposition or atomic layer deposition in a reactor/reactor vessel for producing atmospheric parameters, wherein the cover is completely or partially and the orientation of the crystallites is stochastically ordered.

Transition metal dichalcogenides are, particularly advantageously, $MoS_2$, $WS_2$, $MoSe_2$, $MoS_{2(1-x)}Se_{2x}$, $WS_{2(1-x)}Se_{2x}$, $MoS_2WS_2$, $MoSe_2WSe_2$, $MoS_2NbSe_2$, $MoSe_2NbSe_2$, MoSSe, or WSSe.

By a post-treatment, this arrangement can be provided with a cover layer, which is applied by means of a suitable method.

Light can be coupled into the mode of the arrangement, wherein, as a result of the non-linear interaction in the fiber mode/in the non-linear waveguide with TMDC coating, this light can be converted to decoupled, non-linearly modified light or to new light in the form of decoupled, non-linearly generated light.

This conversion is largely based upon the non-linear interaction within the TMDC layer.

In this case, three-wave or four-wave mixing can be used as the non-linear interaction, wherein the coupled-in light represents one or more pump waves.

The interaction can moreover be modulated by the fiber dispersion and the mode properties.

The modified or newly-generated light (useful light) can be decoupled from the fiber and can thus be used.

In this case, the interaction is singly or multiply degenerate as well as spontaneous or non-spontaneous.

The interaction can be based upon sum frequency generation, difference frequency generation, generation of second harmonic, generation of third harmonic, self-phase modulation, supercontinuum generation, stimulated Raman scattering, or generation of dispersive waves.

Which mediate interaction between different guided modes of the waveguide at different wavelengths.

The method for producing this arrangement/this component runs as a modified chemical vapor deposition method as follows, in order to deposit individual crystals or a few atomic layers of thick-layer TMDC's over fiber lengths of a few centimeters:

1. Derivation/selection of a suitable waveguide or of an optical fiber with favorable properties for the particular application, and significant energy transport on the surface of the waveguide or in a cavity. These include:
   a. a low mode cross-section for increasing the light intensity at a given power and for increasing the relative mode portions, which are guided in cavities
   b. sufficiently low optical losses for the particular application, due to absorption, scattering, bending, or unfavorable guiding properties
   c. favorable dispersion properties, as are, for example, required for the phase matching of non-linear waves.

In this case, the waveguide or the fiber is selected from a base material which entails favorable mode properties and is sufficiently temperature-stable enough to pass through the coating process without damage. Photonic crystal fibers of $SiO_2$ or etched waveguides made of $SiO_2$ or Si are favorable in this context. and 2. Growth of TMDC's on the surface of the fiber or of the waveguide or in a cavity in a gas-phase-based coating process, e.g., in a CVD reactor or an ALD reactor with suitable precursor gases and, optionally, with the aid of further energy suppliers, such as reactive chemicals or plasmas. The reactor must provide the appropriate precursors, produce the appropriate ambient conditions at the desired deposition position, and guide the reaction mixture to the deposition position.

Optionally, to the extent necessary, a post-treatment takes place in a further 3rd step. This post-treatment can serve to modify the TMDC's (e.g., by induction of defects by means of plasma or ion-beam damage damage) or to functionalize them (by enrichment with selectively reactive groups) or to passivate them, e.g., by overlaying with a protective layer. Steps 2 and 3 can be repeated several times.

In the component thus produced by chemical vapor deposition, with monolayer $MoS_2$ and $WS_2$ crystals on the core of microstructured, exposed-core optical fibers in the form of a waveguide, e.g., on the core of a silica glass fiber with an exposed core (also referred to as ECF), the intended coupling of light into the mode of the waveguide takes place. The light is transported through the waveguide and interacts, with a portion of the mode, with the TMDC's, the non-linearly induced polarization of which causes conversion of the guided light, wherein the generated light is again preferably propagated in the fiber mode. Subsequently, the converted light is decoupled.

The invention is explained in more detail below with reference to the schematic drawing and the exemplary embodiment. The figures show:

FIGS. 3a-b: a fiber-integrated PL measurement, in which the laser/white-light source is coupled into the guided mode of the TMDC-coated ECF. There, it excites excitons in the TMDC coating, which emit PL back into the fundamental mode. The PL signal is then recorded after it is propagated through the fiber.

FIGS. 4a-g: third harmonic spectra. The THG band of 540 to 560 nm is marked in orange (inset) and shows the power dependence of the THG for the $MoS_2$-coated ECF, with cubical fit, FIG. 4b: log plot of the non-linear polarization field that induces the THG. The field is determined by the third power of the FM and the local non-linear effect of $SiO_2$ and $MoS_2$, wherein the inset is a zoom of the exposed surface, which illustrates the strong contribution of the highly localized, non-linear polarization of $MoS_2$, FIG. 4c: modal THG overlap coefficients at a TH wavelength of 550 nm calculated for all HOM's k in proximity to the phase matching point. The PM range is marked in blue. The stacked, colored bars mark the contributions of the $SiO_2$ core (blue) or $MoS_2$ coating (orange) to $\gamma_k^{THG}$, FIG. 4d: an image of the light distribution of the THG field at the end of an uncoated ECF, FIG. 4e: an image of the light distribution of the THG field at the end of a $MoS_2$-coated ECF, FIG. 4f: an image at the end of the ECF as a superimposition of $M_1$ and $M_2$ with a power distribution of 80/20, approximately according to the overlap coefficients $\gamma_k^{THG}$ for the uncoated ECF, and FIG. 4g: simulated image at the end of the ECF as a superimposition of the $M_1$, $M_2$, and $M_3$, according to a 62/13/25 power distribution, approximately according to the overlap coefficients for the $MoS_2$-coated ECF.

Figure 1A:
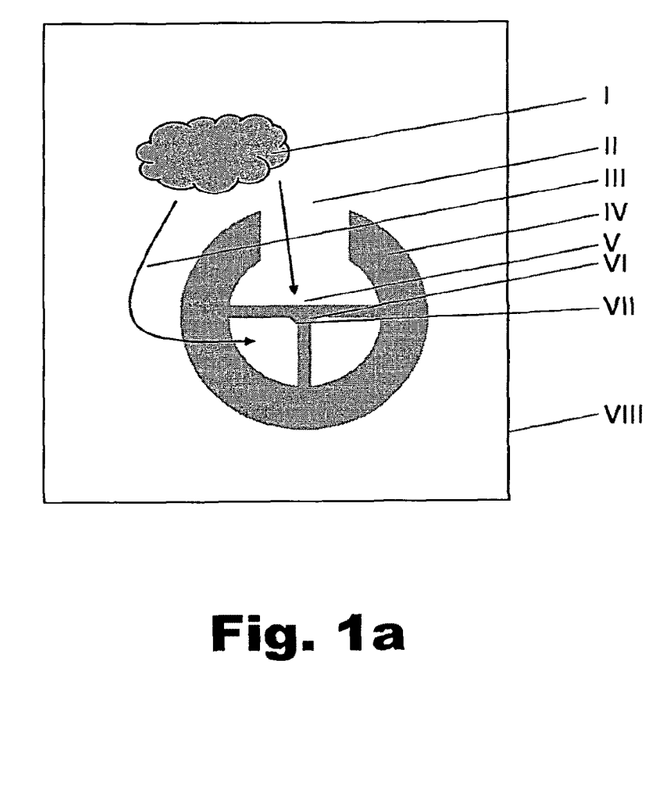
FIG. 1a: a schematic representation of an embodiment of the component according to the invention.

The arrangement/component shown in FIG. 1a consists of an optical waveguide or an optical fiber/fiber cladding substrate or waveguide substrate (IV) with an adapted geometry, which defines the light-guiding properties of the fiber mode/the fiber modes/of the structured, wave-guiding, fiber core with designed dispersion properties (VI).

In addition, the mode can overlap with the physical surface of the waveguide/the outer waveguide surface (V) or with an accessible cavity/the inner waveguide surface (VII).

In addition, during convective or forced transport of the atmosphere to the surface of the waveguide or of the fiber (II) or of the inner surface, during convective or forced transport of the atmosphere along cavities of the waveguide or of the fiber (III), a cover, produced by means of chemical vapor deposition or atomic layer deposition in a reactor/reactor vessel for producing atmospheric parameters (VIII), in the form of a grown, atomically-thin layer of transition metal dichalcogenides, is located on the surface, wherein the cover is completely or partially and the orientation of the crystallites is stochastically ordered.

Transition metal dichalcogenides are, particularly advantageously, $MoS_2$, $WS_2$, $MoSe_2$, $MoS_{2(1-x)}Se_{2x}$, $WS_{(1-x)}Se_{2x}$, $MoS_2WS_2$, $MoSe_2WSe_2$, $MoS_2NbSe_2$, $MoSe_2NbSe_2$, MoSSe, or WSSe.

By a post-treatment, this arrangement can be provided with a cover layer, which is applied by means of a suitable method.

Figure 1B:
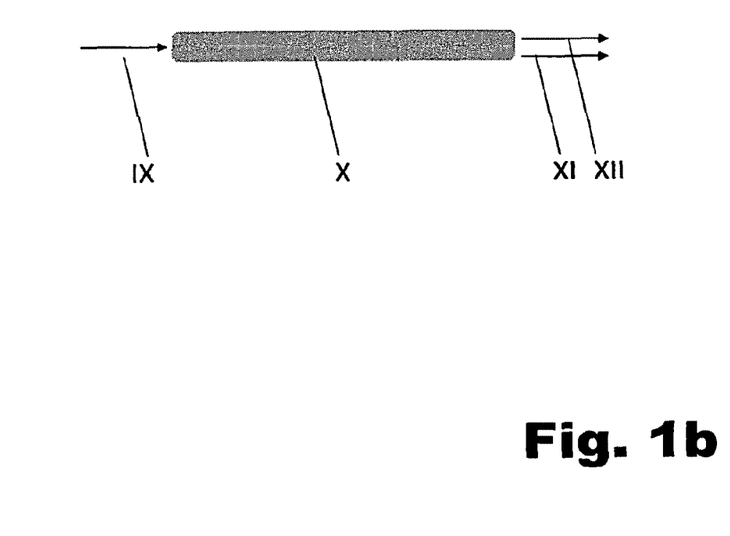
FIG. 1b: the component according to the invention according to FIG. 1a in its intended use.

As shown by way of example in FIG. 1b, light (IX) can be coupled into the mode of the arrangement, wherein, as a result of the non-linear interaction in the fiber mode/in the non-linear waveguide with TMDC coating (X), this light can be converted to decoupled, non-linearly modified light (XI) or to new light in the form of decoupled, non-linearly generated light (XII).

This conversion is largely based upon the non-linear interaction within the TMDC layer.

In this case, three-wave or four-wave mixing can be used as the non-linear interaction, wherein the coupled-in light represents one or more pump waves.

The interaction can moreover be modulated by the fiber dispersion and the mode properties.

The modified or newly-generated light (useful light) can be decoupled from the fiber and can thus be used.

In this case, the interaction is singly or multiply degenerate as well as spontaneous or non-spontaneous.

The interaction can be based upon sum frequency generation, difference frequency generation, generation of second harmonic, generation of third harmonic, self-phase modulation, supercontinuum generation, stimulated Raman scattering, or generation of dispersive waves.

Which mediate interaction between different guided modes of the waveguide at different wavelengths.

The method for chemical vapor deposition of monolayer $MoS_2$ and $WS_2$ crystals on the core of microstructured exposed-core optical fibers, e.g., on the core of a microstructured silica glass fiber with exposed core (also referred to as ECF), comprises the following steps, in order to deposit individual crystals or a few atomic layers of thick-layer TMDC's over fiber lengths of a few centimeters:

1. Derivation/selection of a suitable waveguide or of an optical fiber with favorable properties for the particular application, and significant energy transport on the surface of the waveguide or in a cavity. These include:
   a low mode cross-section for increasing the light intensity at a given power and for increasing the relative mode portions, which are guided in cavities,
   sufficiently low optical losses for the particular application, due to absorption, scattering, bending, or unfavorable guiding properties, and favorable dispersion properties, as are, for example, required for the phase matching of non-linear waves.

In this case, the waveguide or the fiber is selected from a base material which entails favorable mode properties and is sufficiently temperature-stable enough to pass through the coating process without damage. Photonic crystal fibers of $SiO_2$ or etched waveguides made of $SiO_2$ or Si are favorable in this context.

2. Growth of TMDC's on the surface of the fiber or of the waveguide or in a cavity in a gas-phase-based coating process, e.g., in a CVD reactor or an ALD reactor with suitable precursor gases and, optionally, with the aid of further energy suppliers, such as reactive chemicals or plasmas. The reactor must provide the appropriate precursors, produce the appropriate ambient conditions at the desired deposition position, and guide the reaction mixture to the deposition position.

3. Optionally, a post-treatment may also take place as needed. This post-treatment can serve to modify the TMDC's (e.g., by induction of defects by means of plasma or ion-beam damage damage) or to functionalize them (by enrichment with selectively reactive groups) or to passivate them, e.g., by overlaying with a protective layer.

4. Steps 2 and 3 can be repeated.

In the component thus produced, light is coupled into the mode of the waveguide as intended. The light is transported through the waveguide and interacts, with a portion of the mode, with the TMDC's, the non-linearly induced polarization of which causes conversion of the guided light, wherein the generated light is again preferably propagated in the fiber mode. Subsequently, the converted light is decoupled.

By means of this method, scalable functionalization of optical fibers with atomically-thin semiconductors is possible.

The arrangement produced by means of scalable and reproducible growth of high-quality atomic layers on optical fibers/the components produced with the atomically-thin transition metal dichalcogenides are very well suited for integrated optoelectronic and photonic systems due to their exciton-driven, linear and non-linear, light-material interaction, wherein their integration into optical fibers opens up new possibilities in optical communication, contactless measurement technology, and fiber opto-electronics.

For example, the arrangement/the component opens up different possible applications of 2-D-functionalized waveguides in glass fiber technology.

Simultaneous excitation and collection of photoluminescence of the excitonic 2-D material with the fiber modes is thus possible, which enables a new path for remote exploration.

The highly localized, non-linear polarization of the monolayer can also be changed by the third harmonic generation, which opens up a new path for adapting non-linear optical processes in fibers.

This is made possible by growing TMDC's (monolayer TMD's) directly on the optical core of microstructured fibers with exposed core (ECF's) and converting them into 2-DFWG's in a scalable process. In particular, the growth of $MoS_2$ and $WS_2$ monolayer crystals on the optical core of silica glass ECF are of particular importance, in that their interaction with the evanescent fields entails highly-localized modes. As a result of the modified chemical vapor deposition process, growth is made possible, which results in accumulations of monolayer TMDC crystals of high quality with a typical length of 30 µm on ECF's with a length of a few centimeters.

This scalable technique smoothes the way for 2-DFWG's as a new tool for integrated optical architectures, active glass fiber networks, distributed sensor systems, and photonic chips.

The possible functionalities of these 2-DFWG's are set out in the two following exemplary embodiments.

The first exemplary embodiment shows the fiber-based excitation and collection of photoluminescence (PL), which can smooth ways for future experiments in excitonic systems and remote, fiber-based sensor schemes.

The second exemplary embodiment shows the manner in which the highly non-linear TMDC coating changes the non-linear wave dynamics in ECF's by examining amplified third harmonic generation (THG). In general, this shows that 2-DFWG's can be used to improve and adjust the non-linear response of integrated wave systems without changing the guided modes themselves, resulting in new applications in non-linear light conversion and optical signal processing.

Figure 2:
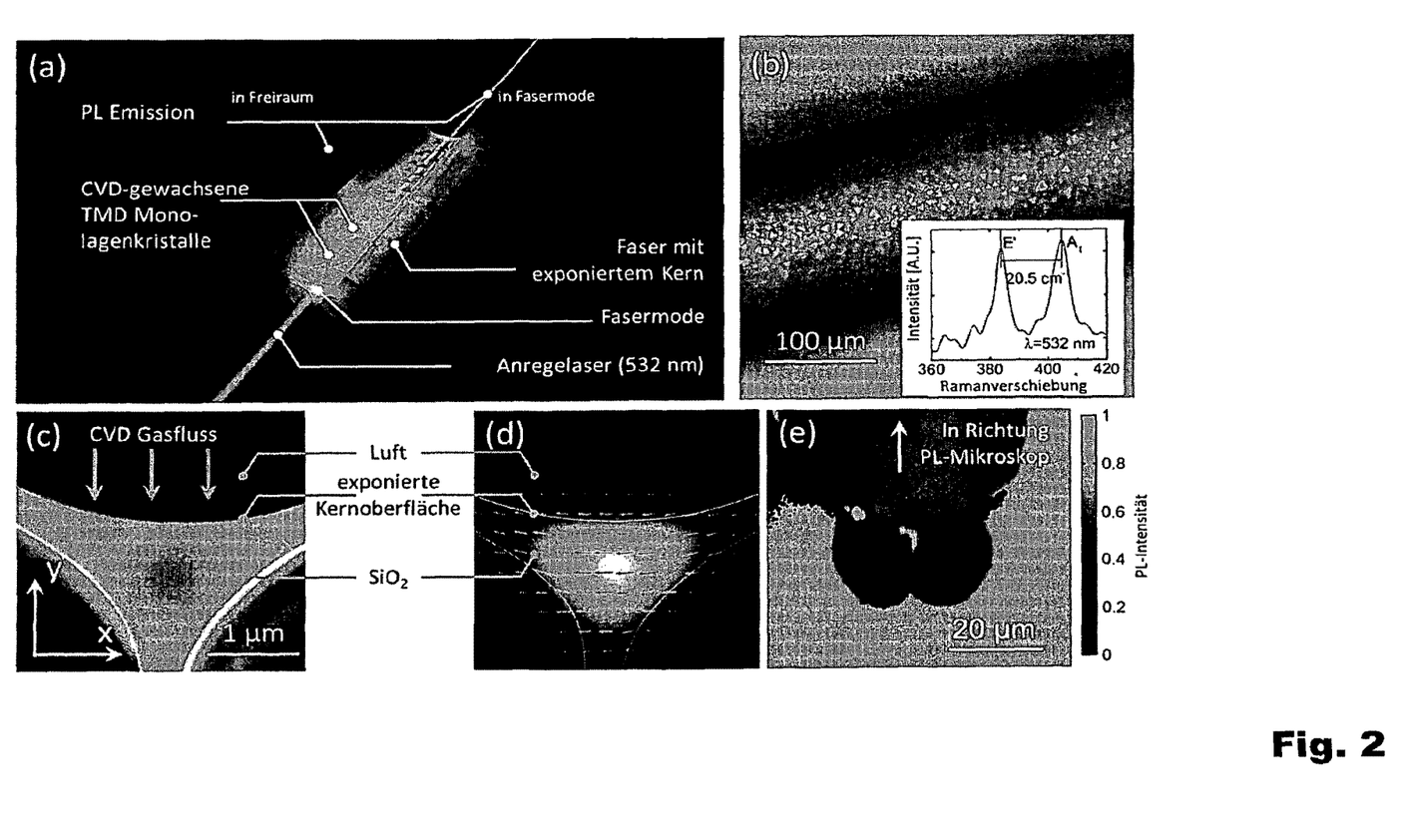
FIG. 2a: an ECF-based 2-DFWG, in which PL is excited by a fiber mode and is emitted into the free space and into the fiber mode and can be detected in both directions.
FIG. 2b: an optical microscope image of the $MoS_2$-coated ECF with $MoS_2$ crystals on the exposed core part of the fiber (clearly visible as bright triangles), as well as the associated inset of a typical Raman spectrum of $MoS_2$ monolayer crystals grown on an ECF.
FIG. 2c: a cross-section SEM image of the core region of the ECF (bright regions are $SiO_2$ regions, while dark regions are free of material), wherein the gas flow at the CVD reactor is indicated by orange arrows.
FIG. 2d: a standard representation of the simulated electrical field distribution of the fundamental fiber mode at 1,570 nm.
FIG. 2e: a cross-section PL mapping of $MoS_2$-coated ECF, which is superimposed with an SEM image for better understanding.

The overall concept of these two exemplary embodiments is shown in FIG. 2 (*a*). The ECF's are coated with $MoS_2$ crystals and $WS_2$ crystals on the entire surface of the groove, which also forms the upper surface of the ECF core. A laser is coupled into the fundamental mode (FM) of the ECF, which interacts with the TMDC's via the evanescent part of the mode. The resulting polarization; e.g., PL or third harmonic (TH) light, is coupled back into the fiber mode or into the free space, where it can be collected for further analysis.

An optical microscope image of the coated, exposed side of the ECF is shown in FIG. 2*b*, together with high-quality $MoS_2$ crystals. The focal plane of the image is selected to correspond to the bottom of the groove, which extends over the entire length of 60 mm of the coated ECF, which simultaneously forms the top of the exposed core.

Figure 3:
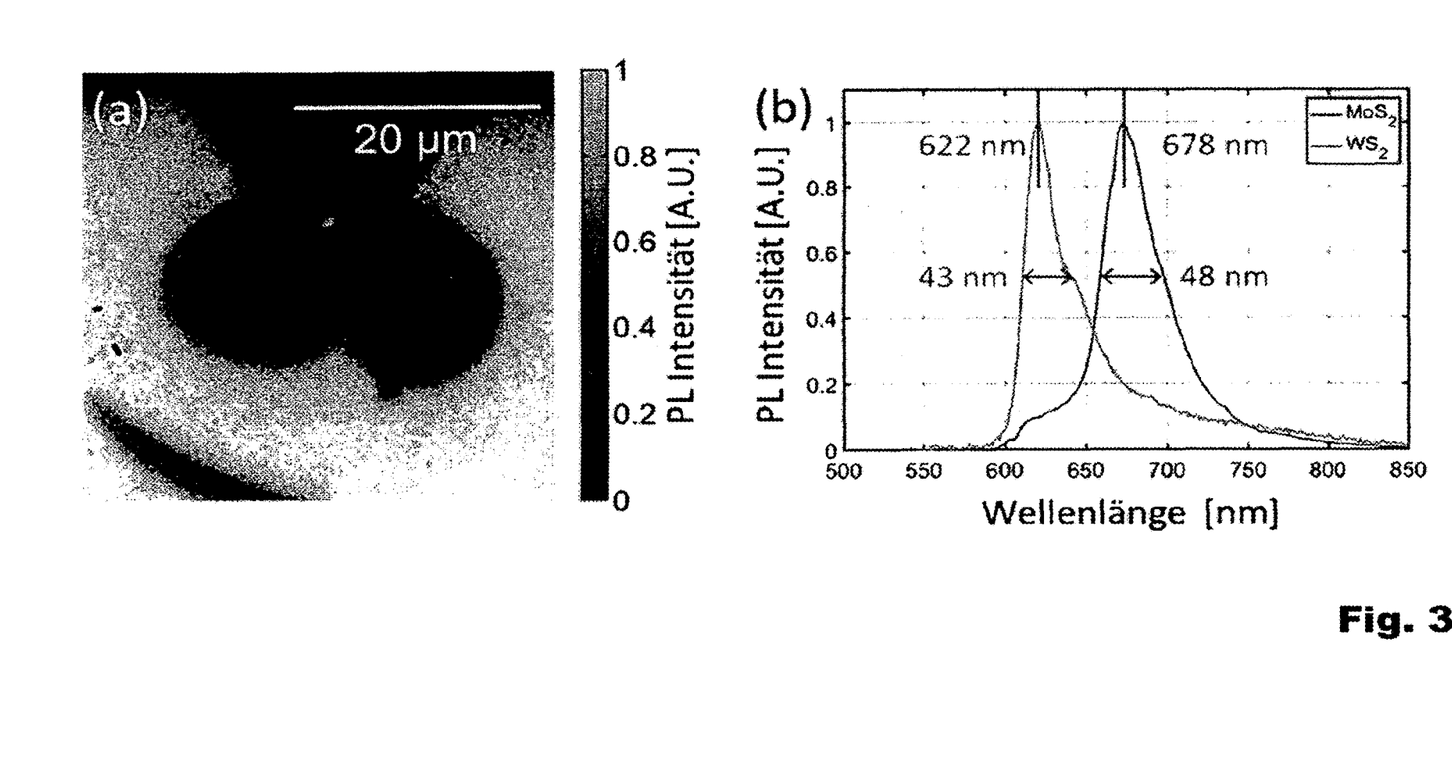
FIG. 3a: a false color image of PL, which is excited by a 532 nm laser in a $MoS_2$-coated ECF, wherein the background image is the backside of the ECF recorded by the same camera.
FIG. 3b: a normalized PL spectra of $MoS_2$- and $WS_2$-coated ECF excited by a 532 nm laser.

FIG. 2*c* shows a cross-sectional scanning electron microscopy (SEM) of the core region of the ECF [an SEM image of the entire ECF cross-section is shown in FIG. 3*a*]. The core is suspended from three struts of silica glass. The upper boundary of the core forms the bottom of a groove, which extends along the entire length of the ECF. In the CVD reactor, the upper boundary of the core is thus completely exposed to the CVD reactants.

In this way, monolayer TMDC crystals are grown on the entire surface of the ECF, and thus also on the exposed surface of the fiber core. Their size, distribution, and thickness can be set in the growth process.

After careful optimization, monolayers are almost exclusively grown, as evident from the inset of FIG. 2*b*, which shows a typical Raman spectrum of the $MoS_2$ crystals on the ECF, which has characteristic distances between the Raman modes for monolayers.

Examples of alternative growth modes along with their Raman spectra are shown in FIGS. 3*c* through *e*.

The core of the ECF has a diameter ~2 µm and supports two non-degenerate FM's that are largely polarized along the x- and y-directions. However, the x-polarized FM, oriented with the polarization parallel to the coated surface, has a better field overlap with the TMDc layer, and its polarization is aligned to the large $X_{xxxx}^{(3)}$ components of the non-linear tensor of the TMDC's. All experiments and simulations are therefore performed with the x-polarized FM. Its field distribution was calculated numerically and is shown in FIG. 2*d* for a wavelength $\lambda_0 = 1,570$ nm.

Due to the small size of the core, the FM, with an effective area of about 3.5 µm², is greatly limited. 1.6% of the electromagnetic energy flows in the air region above the core of the ECF and can thus effectively interact with the TMDC crystals.

First Exemplary Embodiment: Waveguide Photoluminescence

First, the position and PL activity of the TMDC crystals, which are grown on the curved ECF core, is checked by performing a cross-section PL emission measurement.

The PL map shown in FIG. 2e is superimposed with a cross-section SEM image of the ECF for better understanding. Illumination and collection of PL light are guided laterally through the groove of the uncut ECF. It should be noted that the PL follows the outline of the ECF, which indicates that the TMDC crystals have grown in direct contact with the entire surface of the ECF. It should be noted that the part of the PL light that extends downwards from the image center is caused by diffraction at the ECF core and its interaction with the confocal diaphragm, and does not indicate the presence of TMDC's in the core.

Figure 4:
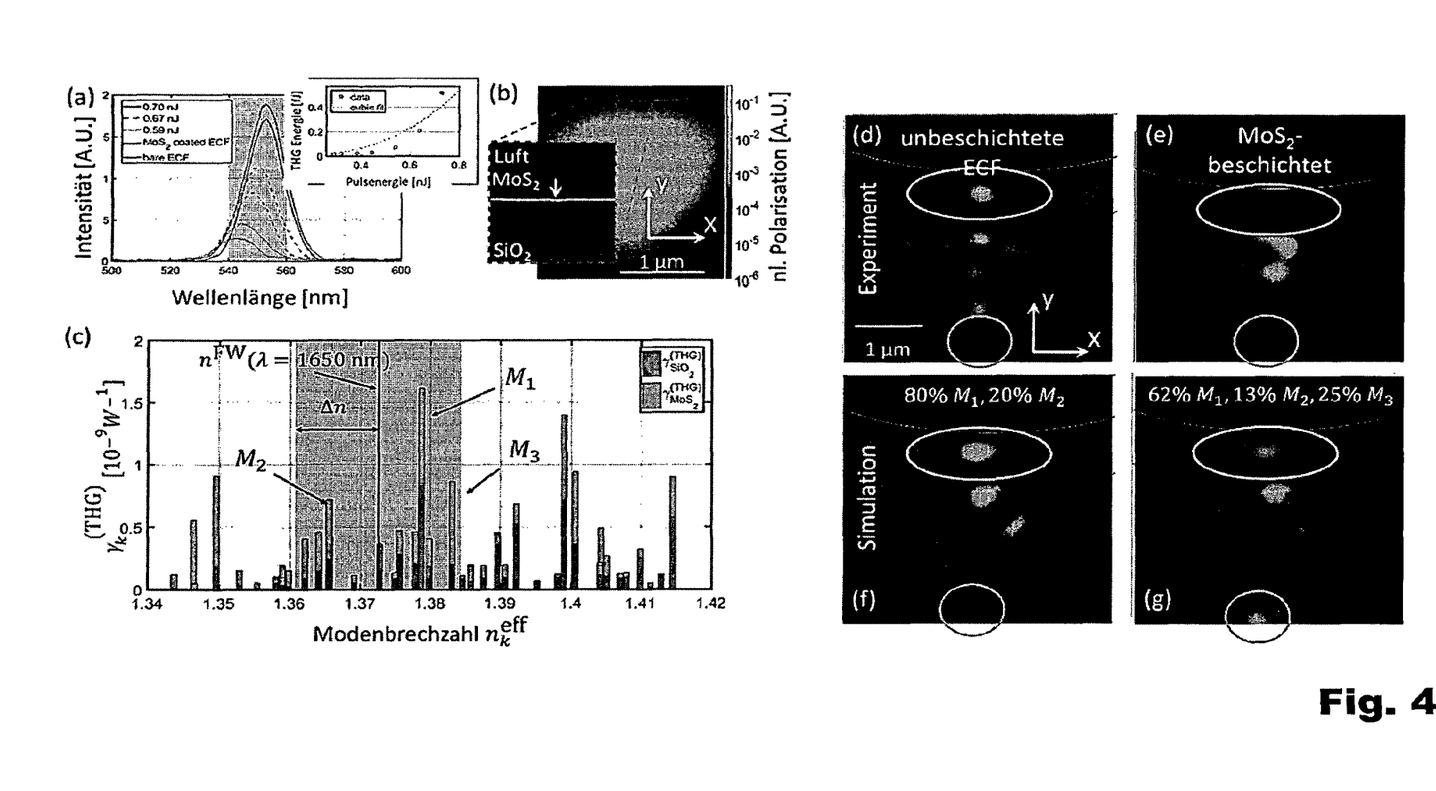

A PL map along the propagation direction and a PL spectrum are shown in FIG. 4.

The guided wave excitation of PL in 2-DFWG's is facilitated by the excitation and decomposition of excitons in the TMDC coating.

Excitons in TMDC's are particularly advantageous, since they have spin-valley coupling and are important for the emission of single photons.

A green ($\lambda$=532 nm) laser of uncontrolled polarization is coupled into the ECF, which excites the evanescent field of the FM excitons.

PL from the TMDC monolayers is either emitted into the free space or coupled back into the ECF mode.

The remission into guided modes was observed by imaging the end face of the fiber and by measuring the spectrum. The results are shown in FIGS. 3a and b.

The image of the PL at the front facet of the ECF is long-pass-filtered to remove residual laser radiation and then shown in FIG. 3a. For better orientation, a microscope image of the ECF itself is superimposed. The PL light is clearly emitted from the guided modes in the core of the ECF. This light is then analyzed by spectroscopy, wherein exciton peaks at 678 nm ($MoS_2$) and 622 nm ($WS_2$) are measured. This means that the evanescent field of the guided modes can be used to both excite and collect PL, so that 2-DFWG's, such as TMDC-coated ECF's, are highly interesting for integrated excitonics and non-contact sensor system applications.

The lateral emission into the free space was observed with a laterally-mounted camera that imaged the bottom of the ECF groove. Composite images of the distribution of PL are thus achieved over a substantial part of the ECF, and thus a distribution of PL-active TMDC crystals.

From the image of a $MoS_2$-coated fiber, the distribution and the cumulative length of monolayer crystals on the ECF can be extracted. For this specific exemplary embodiment, 39 different $MoS_2$ crystals with an average length per crystal of 25 μm and a fill factor of 5.4% are present, although the coverage in later batches can be significantly increased after further optimization of the method.

Second Exemplary Embodiment Amplification of the Third Harmonic

TMDC's are also particularly advantageous due to their highly non-linear optical response per thickness. In third-order processes, this is quantified by the non-linear refractive index $n_2$ with a value of $n_2^{MoS_2}$~$2.7 \cdot 10^{-16}$ m$^2$/W for TMDC's transmitted on waveguides. At about four orders of magnitude more than silica glass, it is extremely large, although lower values are reported on planar substrates.

A TMDC coating may thus substantially contribute to non-linear effects in ECF's, although less than $10^{-4}$ of the energy flow of the FM in the TMDC is localized at each wavelength. The influence on the non-linearity can be quantified by calculating the respective contributions of the $MoS_2$ coating and of the $SiO_2$ core to the total self-phase modulation coefficient $\gamma = \gamma_{MoS_2} + \gamma_{SiO_2}$.[33] In fact, it can be found that $\gamma_{MoS_2} > \gamma_{SiO_2}$ for a wavelength of more than 1,470 nm, i.e., the non-linear contribution of the TMD coating dominates for large wavelengths. It should be noted that even larger $\gamma_{MoS_2}$ can be achieved by optimizing the field overlap of the FM with the TMDC coating, in order to open up the path for TMDC-improved, supercontinuum generation experiments, for example.

While many non-linear, third-order processes are observed in fibers, THG is particularly advantageous, since it is based upon the simultaneous interaction of non-linearity, mode matching, and phase matching (PM). In this case, no significant change in PM occurs due to the TMDC coating, since all linear mode properties, with the exception of losses, are not influenced by the TMDC coating.

The ECF's of the design used here have PM only for higher TH modes (HOM's) at a TH wavelength of approx. 550 nm, which corresponds to a fundamental wavelength of 1,650 nm.

In order to show that THG is actually improved, TH is with a pulsed laser, which functions at a wavelength of $\lambda_0$=1,570 nm and a pulse duration of 32 fs.

FIG. 4a shows the TH spectrum for three different input energies for an uncoated and an $MoS_2$-coated ECF. In this case, there is consistently more THG in the $MoS_2$-coated ECF, which means that the TMDC coating amplifies the THG process. This is particularly advantageous, since the $MoS_2$-coated ECF's have a linear loss of approx. 60% over their length, and the comparison is performed for the same input energy.

As a result of phase matching, TH is not observed exactly at one third of $\lambda_0$, but in a spectral band of 540 nm to 560 nm, which is marked separately in FIG. 4a.

The spectrum of the fundamental wave (FW) spectrum must therefore first be broadened non-linearly in a THG-relevant sub-band between 1,620 nm and 1,680 nm so that TH can be generated. This explains the somewhat stronger than cubic scaling in the inset of FIG. 4a. The similarity of the TH spectrum for both ECF types again makes it clear that the phase matching (PM) between FW and TH is indeed not influenced by the $MoS_2$ coating.

Since PM modification is thus excluded, the present TH improvement must be associated with the process of non-linear light generation itself.

This process is driven by the non-linear polarization field $$P^{THG}\left(\frac{\lambda_0}{3}\right) = E_x^3(x, y; \lambda_0) \cdot \chi^{(3)}_{xxxx}(x, y)e_x.$$

Here, $E_x(x,y)$ is the x component of the electrical field of the FW mode, and $X^{(3)}_{xxxx}(x,y)$ is the dominating element of the non-linear tensor of the THG process for the TMDC coating or the silica core. FIG. 4b shows the form of $P^{THG}$ in a logarithmic scale.

There are two important contributions: the spatially smooth, non-linear polarization from the $SiO_2$ core and the strong, but highly-localized, contribution of the TMDC coating—better visible in the inset.

The TH radiation thus generated is distributed to the TH modes, the size of which is determined by an individual overlap coefficient $\gamma_k^{(THG)}$ for each TH mode. The addition of the TMDC coating thus does not improve the non-linear interaction for all HOM's equally, but increases those that are located near the surface and are provided with prevailing x polarization.

This mode-selective, non-linear amplification is quantified in FIG. 4c, where $\gamma_k^{(THG)}$ values for all TH HOM's close to the PM point are shown. The PM range contains 11 HOM's and is characterized by the shading. The contribution of $SiO_2$ and $MoS_2$ is marked in different colors. While $\gamma_k^{(THG)}$ grows all HOM's, the growth for all modes is very differently pronounced, i.e., the improvement is mode-selective.

In order to confirm this model and compare it to the experiment, only the three HOM's with the highest $\gamma_k^{(THG)}$-values, marked in FIG. 4 c with $M_1$ through $M_3$, are analyzed. The most dominant HOM is the $M_1$ mode at $n_{M_1}^{eff}=1.379$. $\gamma_{M_2}^{(THG)}$ is approximately doubled by the $MoS_2$ coating. The second strongest contribution to the uncoated ECF comes from the $M_2$ mode at $n_{M_2}^{eff}=1.366$, $\gamma_{M_2}^{(THG)}$ increases after application of the TMDC coating by a factor of ~2.5. However, it is here overtaken by the $M_3$ mode at $n_{M_2}^{eff}=1.383$, which almost quadruples its $\gamma_{M_2}^{(THG)}$ value.

The mode-selective improvement of the overlap coefficients is reflected in the spatial distribution of the TH light, as they are shown in the in Figs. and e, which were recorded by a camera, focused on the end face of the ECF's.

The single peak at the top of the ECF is replaced by a wider and weaker triple peak distribution for the $MoS_2$-coated ECF. Moreover, the field is less localized and extends further into the bottom strut for the $MoS_2$-coated ECF. Qualitatively, both distributions can be reproduced by a simple superimposition of the $M_1$, $M_2$, and $M_3$ modes as shown in FIGS. 4f and g, wherein the superimposition coefficients are selected according to the relative values of the overlap coefficients $\gamma_{M_{1-3}}^{(THG)}$ with and without $MoS_2$ coating. The modification at both the upper and the lower edges of the image is remarkably well reproduced for such a simple model—particularly in view of the large uncertainties of the linear and non-linear coefficients of $MoS_2$ and the effects of the random distribution of the crystals on the ECF.

These two exemplary embodiments show that high-quality, crystalline monolayer TMDC's, e.g., $MoS_2$ and $WS_2$, which can be grown directly on the core of microstructured, exposed-core fibers in a scalable CVD process, bring about functionalization of optical fibers, and thus create a new platform for and for utilizing the electro-optical properties of TMDC's. Excitonic and non-linear functionalization is demonstrated in two case studies. First, we excite and collect the excitonic photoluminescence of monolayers in the optical fiber, which enables access to, for example, remote sensing schemes and provides a new platform for investigating excitonic effects.

These two exemplary embodiments also show that TMDC's can subtly change and amplify non-linear optical processes, which the investigations of the mode-selective amplification of the third harmonic generation show. This can improve the design freedom for highly non-linear guided wave systems and can be used in non-linear fiber devices.

Overall, the direct growth of 2-D materials on waveguides into TMDC's opens up a new path for scalable and reproducible functionalization of waveguides, fibers, and other integrated optical systems.

All features shown in the description, the exemplary embodiments, and the following claims can be essential to the invention, both individually and in any combination.

LIST OF REFERENCE SIGNS

I—Reactive atmosphere with precursors for deposition of TMDC's
II—Convective or forced transport of the atmosphere onto the surface of the waveguide or the fiber
III—Convective or forced transport of the atmosphere along cavities of the waveguide or the fiber
IV—Fiber cladding substrate or waveguide substrate
V—Outer waveguide surface
VI—Structured, wave-guiding fiber core with designed dispersion properties
VII—Inner waveguide surface
VIII—Reactor vessel for setting atmospheric parameters
IX—Coupled-in light
X—Non-linear waveguide with TMDC coating
XI—Decoupled, non-linearly modified light
XII—Decoupled, non-linearly generated light

The invention claimed is:

1. A light conversion arrangement in a form of an optical fiber with a core and with or without cavities, consisting of a fiber cladding substrate or a waveguide substrate (IV) with an adapted geometry, which defines the light-guiding properties of the fiber mode with designed dispersion properties (VI), characterized in that a core carries a grown, atomically-thin layer of transition metal dichalcogenides in the form of crystallites, wherein the layer completely or partially covers the core, the crystallites are stochastically ordered, and the layer is located as a monolayer on a wave-guiding region of the core and is grown directly on the core of the fiber by chemical vapor deposition or atomic layer deposition.

2. The arrangement according to claim 1, characterized in that the waveguide or the core carries the layer of transition metal dichalcogenides over a length of 30 μm up to a few centimeters.

3. The arrangement according to claim 1, characterized in that the transition metal dichalcogenides are $MoS_2$, $WS_2$, $MoSe_2$, $MoS_{2(1-x)}Se_{2x}$, $WS_{2(1-x)}Se_{2x}$, $MoS_2WS_2$, $MoSe_2$, $WSe_2$, $MoS_2NbSe_2$, $MoSe_2NbSe_2$, MoSSe, or WSSe.

4. The arrangement according to claim 1, characterized in that the layer of transition metal dichalcogenides is provided with a cover layer.

5. A method for producing an optical component according to claim 1, in which, under a reactive atmosphere with precursor gases for the deposition of transition metal dichalcogenides directly on the surface of the waveguide or of the core (VI) during convective or forced transport of the atmosphere (V; VII) onto the surface (II) of the waveguide or of the core or of the inner surface (III), an atomically-thin layer of transition metal dichalcogenides is grown on said surface by means of chemical vapor deposition or atomic layer deposition in a reactor vessel for producing atmospheric parameters (VIII).

6. The method according to claim 5, characterized in that, after the growth of the layer of transition metal dichalcogenides, a post-treatment takes place in which a modification of the transition metal dichalcogenides takes place by induction of defects by means of plasma or by ion beam damage.

7. The method according to claim 5, characterized in that functionalization of the layer of transition metal dichalcogenides takes place by means of enrichment by means of coupling with selectively reactive groups.

8. The method according to claim 5, characterized in that functionalization of the layer of transition metal dichalcogenides by the passivation thereof takes place by overlaying with a protective layer.

9. The arrangement according to claim 1, wherein the arrangement is designed for efficient, non-linear light conversion.

* * * * *